Oct. 11, 1966 M. W. LA RUE, JR 3,278,681

ILLUMINATION MEANS FOR FACSIMILE TRANSMITTER

Filed Feb. 18, 1964 2 Sheets-Sheet 1

INVENTOR

Mervin La Rue Jr.

By William J. Hooman
Attorney

Oct. 11, 1966 M. W. LA RUE, JR 3,278,681
ILLUMINATION MEANS FOR FACSIMILE TRANSMITTER
Filed Feb. 18, 1964 2 Sheets-Sheet 2

INVENTOR
Mervin La Rue Jr.

By William J. Newman
Attorney

3,278,681
ILLUMINATION MEANS FOR FACSIMILE TRANSMITTER

Mervin W. La Rue, Jr., Barrington, Ill., assignor to Stewart-Warner Corporation, Chicago, Ill., a corporation of Virginia Filed Feb. 18, 1964, Ser. No. 345,788
7 Claims. (Cl. 178—7.1)

This invention relates to illuminating means for facsimile transmitters and more particularly to illuminating means for fascimile transmitters of the type which linearly scan documents to be reproduced.

A highly successful facsimile transmitter in use today comprises a scanner in which a spiral slot in a rotating opaque disc cooperates with a linear slot to provide an opening at the junction of the two slots so that the opening moves linearly across the document. The linearly moving opening is in an optical path between the document and photoelectric means which produces an electric signal in accordance with the light intensity of the portion of the document being scanned. An example of such a receiver is shown in U.S. Patent No. 3,011,020 issued to G. M. Stamps on November 28, 1961.

In this type of transmitter it is necessary that the intensity of illumination on the surface of the scanned document remains stable and unchanging. Nonuniformity of illumination is tolerable within wide limits since an adjustment by means of a compensator bar or the like may be provided to cancel out this and other sources of nonuniformity in the system. However, once the system has been so adjusted, subsequent variations in illumination are highly objectionable especially if they do not occur uniformly through the illuminating means.

Some facsimile scanners use two fluorescent lamps to illuminate a narrow strip across the width of the scanned document. An example of this type of illuminating system may be seen in the copending application of Robt. Bensen et al., Ser. No. 82,568, filed January 13, 1961. In this type the ends of the lamps contribute a portion of the illumination received by the edges of the document but the illumination thereat is not as bright as the more central portions. Actually this inherent nonuniformity is of little consequence because it may be compensated for by means of the compensator bar which is disposed partially within the optical path of the scanner to permit more light from the ends of the scan to pass to the photosensitive means than the central portion.

However, it has been found that the illumination from the lamp ends varies considerably, especially with respect to the illumination in the center of the lamp. Generally this illumination decreases with time at a greater rate than that from the remainder of the lamp but not in any predictable manner. The loss of illumination at the edges becomes noticeable in the video output of the scanner in a relatively short time and causes a darkening of the edges of the reproduced copy in the facsimile receiver.

The darkening of the end portions of the tubes is caused at least in part by a phenomenon known as mercury pumping. D.C. voltages are used in the fluorescent scanning lamps to eliminate any signal output resulting from flickering if A.C. voltages are used. The D.C. voltage ionizes the gas in the fluorescent tubes and causes the heavier positive ions to drift slowly toward the negatively charged electrode and collect on the structure at the end of the tube. Eventually the light intensity along the tube is modified so that there is a substantial loss in the area of the negative electrode. In the facsimile lighting system disclosed in the aforementioned Bensen et al. application this nonuniformity is balanced at both ends of the tube by means of a reversing circuit so that both ends thereof lose their intensity at a more or less uniform rate. But the ends lose intensity at a greater rate than the center of fluorescent tubes.

It is, therefore, an object of this invention to provide illuminating means for copy reproducing devices such as facsimile transmitters in which the effects of nonuniform change of brightness is materially reduced.

It is also an object of this invention to provide an illuminating means for copy scanning apparatus such as facsimile transmitters in which the effects of the deterioration of light intensity at the ends of fluorescent scanning lamps or the like is materially reduced.

Moreover, it is an object of this invention to provide means for reducing the effects of nonuniform light deterioration in the illuminating means which are very cheap to manufacture and extremely economical to apply.

Other objects and advantages of this invention will be readily apparent to one skilled in the art, especially when the specification is read in view of the accompanying drawings in which.

Figure 1:
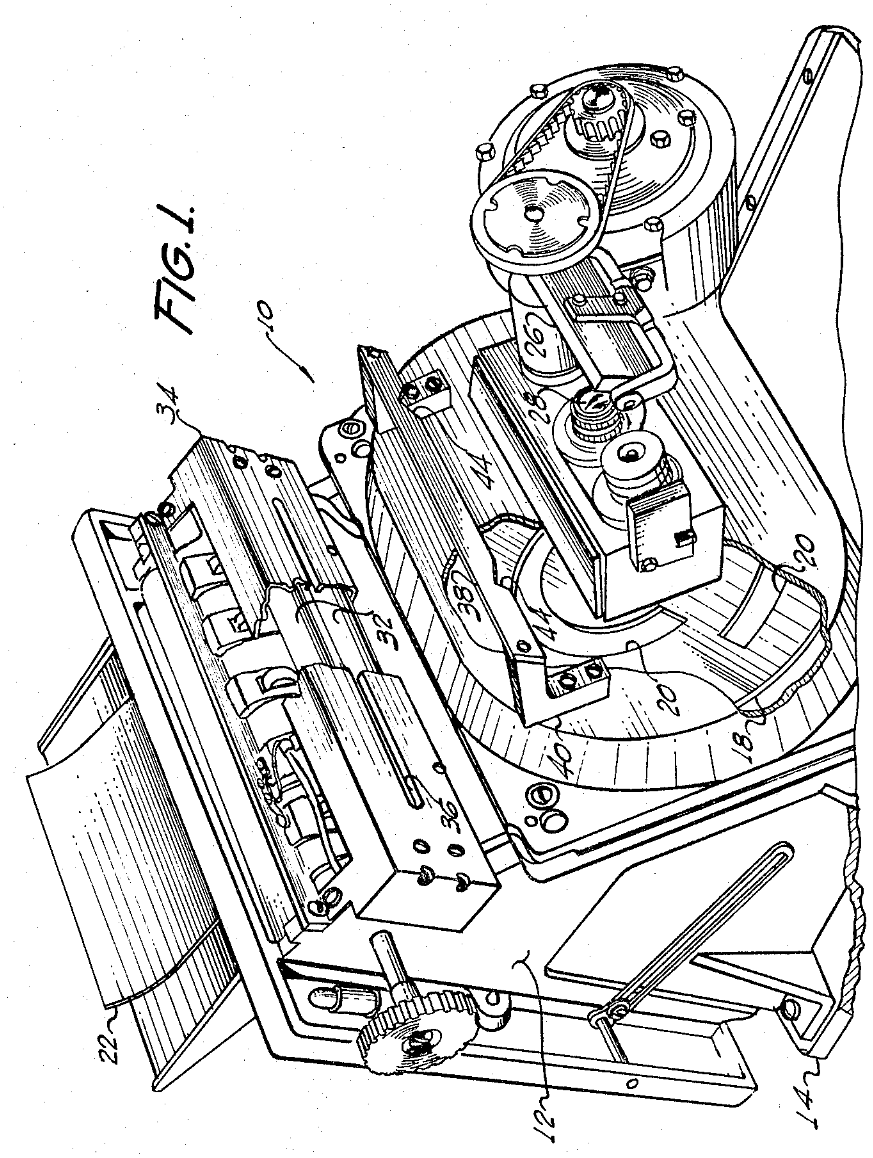
FIG. 1 is a fragmentary isometric view of a facsimile transmitter embodying the teachings of this invention.
Figure 2:
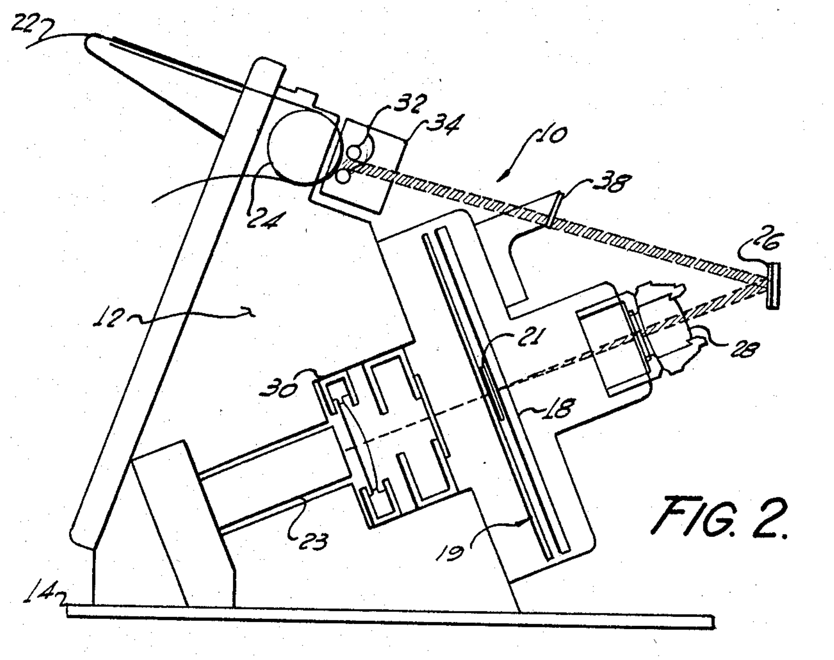
FIG. 2 is a schematic diagram of a facsimile transmitter showing the optical path from document to photosensitive element.
Figure 3:
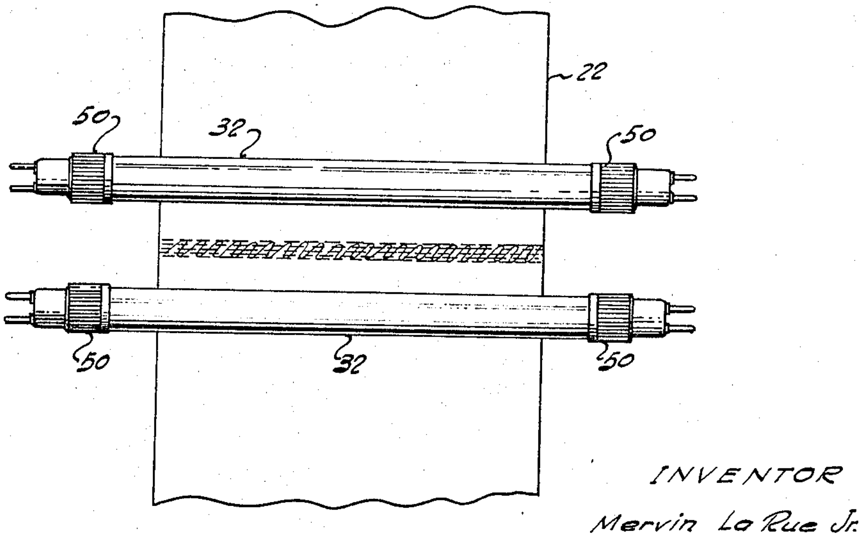
FIG. 3 is a partial view showing fluorescent lamps in accordance with the invention.

Referring now to the facsimile transmitter 10 shown in FIGS. 1 and 2, there is a structure 12 mounted on a plate 14 which serves to support the operating components of the facsimile transmitter. The structure 12 mounts the scanning mechanism 16 which includes first, a rotatable disc 18 with a single spiral slit 20 and a second rotatable disc 19 (FIG. 2) with a multiturn spiral slit. The spiral slits cooperate with a linear slit defined by a plate 21 (FIG. 2) in a manner well known in the facsimile art, as shown in U.S. Patent 2,967,907, issued to G. M. Stamps on January 10, 1961, to provide a linearly translated opening in the optical path between the document 22 and the photoelectric tube 23.

As shown in FIG. 2 an image of a line of the document 22 on copyfeed roller 24 is reflected by a mirror 26 through an objective lens 28, the single turn spiral slit 20 in disc 18, the horizontal slit in plate 14, multiturn spiral disc 19, and a collector lens system 30 to the phototube 23.

The portion of the document on the copyfeed roller 24 being scanned is illuminated by a pair of fluorescent lamps 32 housed within a lamp box 34 having a horizontal slit 36 in the optical path. As previously mentioned the fluorescent lamps, because of their geometry, give off less light at their ends than along their middle portion so that there is an inherent nonuniformity of light along the scanned portion of the document.

A compensator bar 38 is provided in the optical path to adjust the amount of light passing thereby in accordance with the nonuniformity. The bar 38 is fabricated of an opaque material which is mounted by means of brackets 40. It will be seen that the bar is shaped with sloped cutouts 44 adjacent the ends of the scanned path. In this manner more light is permitted to pass from the ends than along the center portion so that the light reaching the mirror and reflected thereon to the photocell is more nearly uniform.

The compensator bar is mounted and adjusted at the factory with a set of new fluorescent bulbs installed therein. The transmitter is tested for uniform intensity with a standard test document and portions of the compensator bar 40 are removed, by hand filing or the like, to correct any nonuniformity. More light is passed along the optical path at the filed portions thus correcting any nonuniformities. A skilled technician can adjust the light intensity along the length of scan and his adjustment will remain permanent.

It has been found, however, that the ends of the lamps vary in intensity with the passage of time in a different manner than along the center portion. Generally the intensity at the ends decreases at a greater rate than that from the remainder of the lamp, but, as indicated, not in a predictable manner. Since it is desirable that the compensator bar adjustment be made permanent, it is necessary that the variations in intensity along the length of the fluorescent lamps be reduced to a minimum.

Applicant accomplishes this result by providing masks 50 for the ends of each of the fluorescent tubes 32. The masks 50 may be of any opaque material or stable semi-opaque material and applied to shield the scanned area of the document from the light emanating from the ends of the fluorescent lamps. Although there are any number of means for masking the lamp ends, such as silvering or painting, a preferable means is a pressure sensitive metal foil with an adhesive backing which will firmly adhere to the fluorescent tube glass.

It can be readily seen that a most economical solution is provided to the problem of facsimile lighting. The adhesive labels permit the use of standard off-the-shelf fluorescent lamps and no special means need be added to the transmitter structure itself. The labels themselves of course may be manufactured very cheaply and the cost of installation and maintenance is almost nonexistent. Since the masks reduce the light intensity at the ends of the fluorescent lamps, it is necessary that the cutouts 44 adjacent the ends of the scanning path be somewhat larger than previously. This may be done in the manufacturing and testing stage and the bar 40 will compensate for the light variations along the scanning path in a more accurate manner during the operating life of the transmitter.

While there has been shown a preferred embodiment of the invention, it is recognized that many modifications and additions may be made thereto without departing from the spirit thereof. It is therefore intended to be bound only by the scope of the appending claims.

What is claimed is:

1. For use in a facsimile transmitter of the type which scans a document along a linear path to transmit an image along an optical path to a photosensitive element, means for illuminating the document along said linear path comprising, in combination a pair of straight fluorescent bulbs parallely arranged with and illuminating said linear scanning path, an opaque metal foil in adherence about the ends of each bulb, and a light compensating device comprising an opaque bar transverse to and partially blocking said optical path, said bar being substantially linear along the middle portion of said optical path and curved away from said optical path adjacent the edges thereof.

2. For use in a facsimile transmitter of the type which scans a document along a linear path to transmit an image along an optical path to a photosensitive element, means for illuminating the document along said linear path comprising in combination at least one straight fluorescent bulb parallely arranged with and illuminating said linear scanning path, an opaque metal foil in adherence about the end of said bulb, and means for compensating for the reduced illumination at the ends of said linear scanning path.

3. For use in a facsimile transmitter of the type which scans a document along a linear path, means for illuminating the document along said linear path comprising in combination at least one straight fluorescent bulb and means for masking the end portions of said bulbs to reduce the effects of changes in brightness thereat.

4. For use in a facsimile transmitter of the type which scans a document along a linear path to transmit an image along an optical path to a photosensitive element, means for illuminating the document along said linear path comprising in combination a pair of straight fluorescent bulbs parallely arranged with and illuminating said linear scanning path and an opaque metal foil in adherence about the ends of each bulb for reducing the effects of changes in brightness thereat.

5. For use in a facsimile transmitter of the type which scans a document along a linear path, means for illuminating the document along said linear path comprising at least one straight fluorescent bulb parallely arranged with said linear scanning path and an opaque sleeve surrounding the end portions of said bulb for reducing the effects of changes in brightness thereat.

6. For use in a facsimile transmitter of the type which scans a document along a linear path to transmit an image along an optical path to a photosensitive element and having a pair of straight fluorescent bulbs parallely arranged with and illuminating said linear scanning path, with a light compensating device including an opaque bar transverse to and partially blocking said optical path, an opaque metal foil for adherence about the ends of each of said bulbs for reducing the effects of changes in brightness thereat.

7. For use in a facsimile transmiter of the type which scans a document along a linear path to transmit an image along an optical path to a photosensitive element, and having a pair of straight fluorescent bulbs parallely arranged with and illuminating said linear scanning path, an opaque metal foil for adherence about the ends of each bulb for reducing the effects of changes in brightness thereat.

References Cited by the Examiner

UNITED STATES PATENTS 3,198,982 8/1965 Benson et al. ---------- 315—97

DAVID G. REDINBAUGH, *Primary Examiner.*

R. L. RICHARDSON, *Assistant Examiner.*